(12) United States Patent
Anzai et al.

(10) Patent No.: US 6,259,597 B1
(45) Date of Patent: Jul. 10, 2001

(54) PORTABLE ELECTRONIC DEVICE

(75) Inventors: Masato Anzai, Machida; Yoshinari Toyosato, Yamato, both of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/375,051

(22) Filed: Aug. 16, 1999

(30) Foreign Application Priority Data

Sep. 30, 1998 (JP) ................................... 10-278134

(51) Int. Cl.[7] ................................ G06F 1/16; H05K 7/16
(52) U.S. Cl. ......................... 361/683; 361/680; 361/681; 345/169; 345/905
(58) Field of Search ..................... 361/683, 681, 361/680, 686; 345/173, 905, 169, 175; D14/100, 107, 106, 113, 115

(56) References Cited

U.S. PATENT DOCUMENTS

| 5,164,542 | * | 11/1992 | Hart ...................................... 361/683 |
| 5,386,298 | * | 1/1995 | Bronnenberg et al. . |
| 5,640,574 | * | 6/1997 | Kawashima . |
| 5,644,469 | * | 7/1997 | Shioya et al. ......................... 361/681 |
| 5,949,408 | * | 9/1999 | Kang et al. ........................... 345/169 |
| 5,983,073 | * | 11/1999 | Ditzik . |
| 6,088,025 | * | 7/2000 | Akamine et al. ..................... 345/175 |
| 6,124,919 | * | 9/2000 | Kubo et al. ........................... 349/169 |
| 6,137,676 | * | 10/2000 | Merkel ................................. 361/680 |

FOREIGN PATENT DOCUMENTS

| 6161636 | 11/1992 | (JP) | ................................. G06F/1/16 |
| 7036568 | 7/1993 | (JP) | ................................. G06F/3/03 |
| 7072961 | 7/1993 | (JP) | ................................. G06F/3/02 |
| 7160418 | 9/1993 | (JP) | ................................. G06F/1/16 |
| 6208425 | 11/1993 | (JP) | ................................. G06F/3/02 |
| 9128123 | 5/1997 | (KR) . | |

* cited by examiner

*Primary Examiner*—Leo P. Picard
*Assistant Examiner*—Lisa Lea-Edmonds
(74) *Attorney, Agent, or Firm*—John B. Schelkopf

(57) ABSTRACT

A touch panel section, which is formed by affixing transparent resistive film sheets onto both of front and back surfaces of a transparent glass plate respectively, is rotatably mounted between a keyboard and a flat panel display each being provided in a portable electronic device such as a notebook computer. The touch panel section is rotated toward the flat panel display or keyboard for selectively switching the involved input methods. That is, with the introduction of the rotatable touch panel section into the portable electronic device, it becomes possible to support three different input operations; an input operation by a fingertip (tablet function), a handwritten input operation (digitizer function) by a pen and a conventional input operation by the keyboard.

5 Claims, 7 Drawing Sheets

Tablet Function

Digitizer Function

Additional Function (1)

Additional Function (2)

PORTABLE ELECTRONIC DEVICE

BACKGROUND OF THE INVENTION

1. Field of the Invention

This invention relates to a portable electronic device such as a notebook personal computer (PC) with a flat panel display and, more particularly, to a portable electronic device with a touch panel that is mounted thereto in such a way that it is rotatable between a flat panel display and a keyboard.

2. Description of the Related Art

A certain type of conventional notebook PC, specifically adapted for use in finance/security/insurance industries, includes a touch panel that is affixed to a front surface of a flat panel display such as a liquid crystal display (LCD). Normally, this touch panel has been used as a "tablet" for accepting or capturing pointing input by a fingertip.

However, none of these notebook PCs include a "digitizer" function, which is exercised after rotating a touch panel provided independently of its flat panel display toward a keyboard, for capturing handwritten character input and for concurrently confirming a result of the input operation on the display screen. That is, since this type of notebook PC has a structural constraint that a touch panel is affixed to a front surface of a flat panel display, it has been impossible to concurrently confirm a result of the input operation by a pen on the display screen. Accordingly, in a case where it is required to use the digitizer function, it has been necessary to attach an external type of digitizer device to a juxtaposed base unit (system unit) of a notebook PC, thereby enabling to confirm a result of the input operation by squinting at the display screen of the notebook PC.

Also, due to the aforesaid structural constraint, this type of notebook PC has a problem in that, in case of inputting a handwritten character or an illustration by using a pen, there is no way to secure a space for placing a paper or a memorandum that describes the content of input information.

SUMMARY OF THE INVENTION

The present invention is directed to a portable electronic device which includes a base unit having a keyboard mounted on a top surface thereof, together with a cover being rotatably hinged at a rear end of the base unit to have an open position and a closed position relative to the base unit. The cover is provided with a flat panel display on a surface that is concealed in the closed position. The device includes a touch panel section formed by affixing transparent resistive film sheets onto both of front and back surfaces of a transparent glass plate respectively. Means for rotatably hinging the touch panel section are provided at a rear end of the base unit. The device includes means, being operative when the touch panel section is rotated toward the flat panel display, for fixing one of the surfaces of the touch panel section to the cover by keeping a predetermined distance from the surface of the flat panel display. Additional means, being operative when the touch panel section is rotated toward the keyboard, are included for maintaining another surface of the touch panel section in a substantially horizontal manner by keeping a predetermined distance from the surface of the keyboard. Means are also provided for electrically connecting one or more electrode terminals of the resistive film sheets to a given component in the base unit.

The electronic device may be a notebook personal computer, while the flat panel display may be a liquid crystal display unit. Also, the touch panel section may be used as a tablet for capturing pointing input when it is rotated toward the flat panel display, while the touch panel section may be used as a digitizer for capturing handwritten character input when it is rotated toward the keyboard. Furthermore, the given component may inhibit concurrent application of electrical signals conveyed from the electrode terminals of the resistive film sheets.

The touch panel section, which is formed by affixing transparent resistive film sheets onto both of front and back surfaces of a transparent glass plate respectively, is rotatably mounted between a keyboard and a flat panel display each being provided in a portable electronic device such as a notebook PC. The touch panel section is rotated toward the flat panel display or keyboard for selectively switching the involved input methods. That is, with the introduction of the rotatable touch panel section into the portable electronic device, it becomes possible to support three different input operations, which include an input operation by a fingertip (hereafter called "tablet function") and a handwritten input operation (hereafter called "digitizer function") by a pen in addition to a conventional input operation by the keyboard. Since this touch panel section is rotated toward either one of the flat panel display and keyboard for supporting an input operation when a user is to use the portable electronic device, and yet it is accommodated in a space between the flat panel display and keyboard when a user is to carry the portable electronic device, it becomes possible to improve the productivity of such input operations without degrading the advantageous space-saving and/or portability features of the portable electronic device.

DETAILED DESCRIPTION OF THE INVENTION

Figure 1:
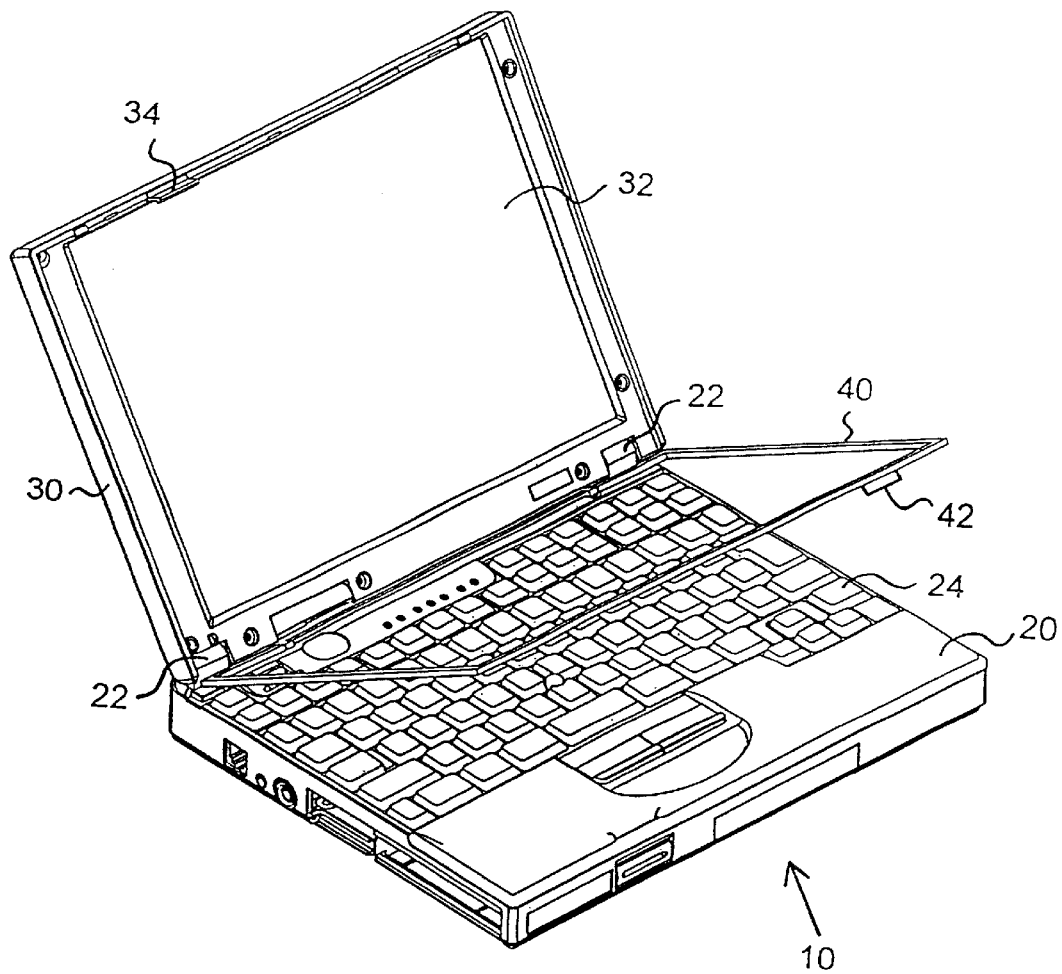
FIG. 1 is a perspective view of a notebook PC 10, which is an example of a portable electronic device in accordance with this invention.

In FIG. 1, there is shown an exterior perspective view of a notebook PC 10 as an example of a portable electronic device in accordance with this invention. As shown in this drawing, the notebook PC 10 generally comprises a relatively thick base unit 20 and a relatively thin cover 30. At a rear end of the base unit 20, a pair of hinge mechanisms 22 is provided. These hinge mechanisms 22 are used for rotatably supporting the cover 30 such that it has an open position and a closed position relative to the base unit 20.

Figure 5:
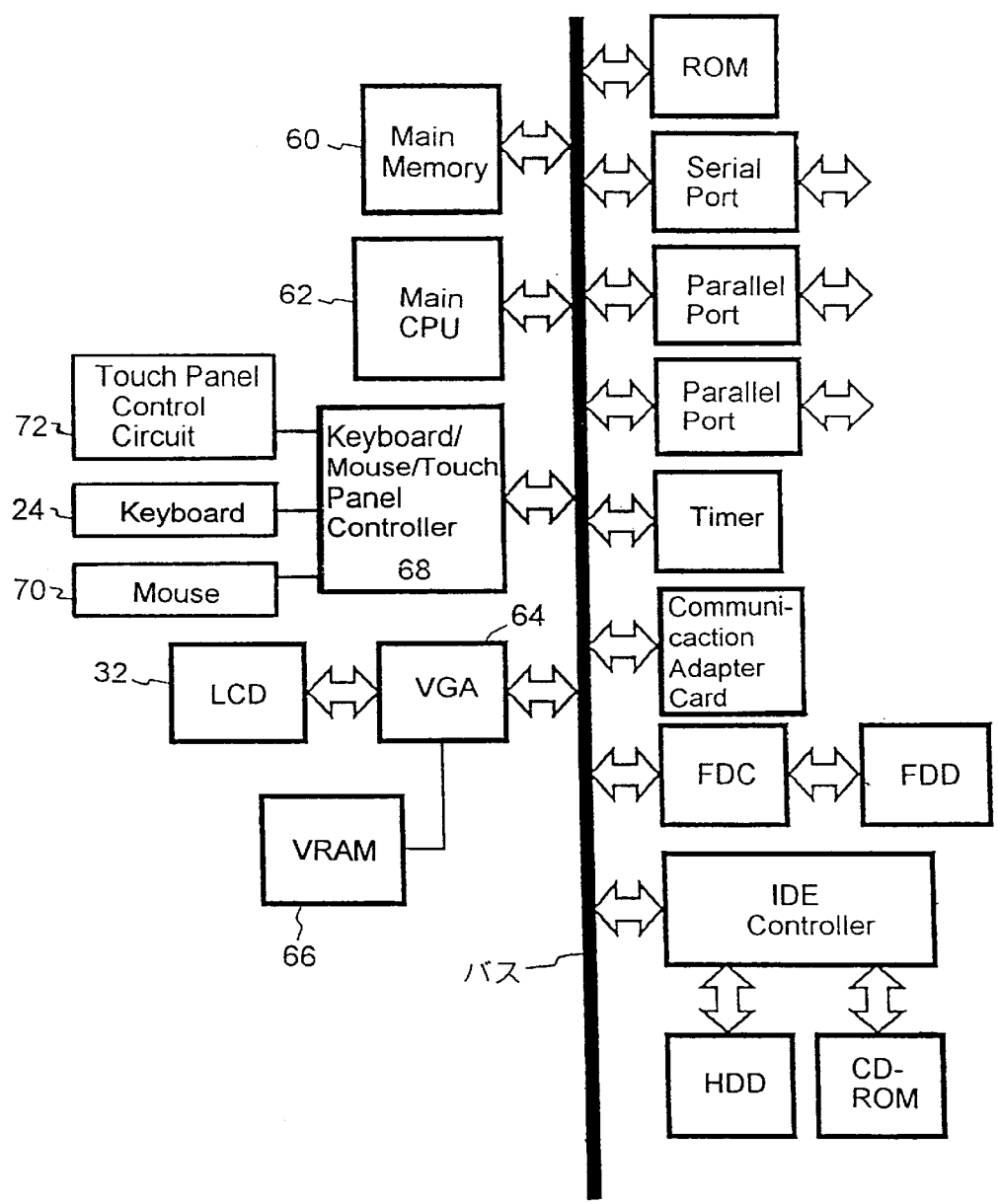
FIG. 5 is a diagram showing a schematic hardware configuration of a notebook PC adapted for implementing this invention.

The base unit 20 has a box like shape, which internally accommodates many hardware components such as a system board having circuit chips like a CPU and memories mounted thereon, internal storage devices like a hard disk drive (HDD), and a battery pack (see FIG. 5). Also, on a top surface of the base unit 20, a keyboard unit 24 is provided as an input device of the notebook PC 10.

On the other hand, within the cover 30, there is provided a liquid crystal display (LCD) 32. As described above, a lower end of the cover 30 is coupled to the hinge mechanisms 22. The LCD 32 may be formed as a flat panel display that exploits the Thin Film Transistor (TFT) or Dualscan Supertwisted Nematic (DSTN) scheme.

When a user wishes to use the notebook PC 10, the cover 30 is moved to its open position as shown in FIG. 1 for causing the keyboard 24 and the display 32 to appear, thereby allowing an input operation and displaying of an output result to be performed. Conversely, when the notebook PC 10 is not to be used, the cover 30 may be moved to its closed position, thereby entirely covering the keyboard 24 and the display 32.

A structural feature in the notebook PC 10 of the present invention resides in that a touch panel section 40, which is formed by affixing transparent resistive film sheets onto both of front and back surfaces of a transparent glass plate respectively, is rotatably mounted between the keyboard 24 and the LCD 32. For this purpose, a hinge mechanism is provided at one end of the touch panel section 40 (see FIG. 2). This hinge mechanism is used to hinge the touch panel section 40 to a rear end of the base unit 20 in the proximity of the aforesaid hinge mechanisms 22, preferably by using the rotation axis thereof.

Also, provided on an upper end of the cover 30 is a latch 34. When the touch panel section 40 is rotated toward the LCD 32 for supporting the tablet function, this latch 34 is used for fixing one of the surfaces of touch panel section 40 to the cover 30 by keeping a predetermined distance from the surface of the LCD 32, thereby preventing the latter surface from being damaged by any possible contact or collision with the former surface. In a condition where the touch panel section 40 is engaged within the latch 34, if it is desired to further rotate the touch panel section 40 toward the keyboard 20, the engagement condition may be released by simply lifting the latch 34 in an upper direction.

Further, provided on an appropriate end of the other surface of the touch panel section 40 are a plurality of protrusion, members 42. (Note however that, for brevity of the drawing, only one protrusion member 42 is shown in FIG. 1). Similarly to the above, when the touch panel section 40 is rotated toward the keyboard 24 for supporting the digitizer function, these protrusion members 42 are used for maintaining the other surface of the touch panel section 40 in a substantially horizontal manner by keeping a predetermined distance from an opposing surface of the keyboard 24, thereby to prevent the former surface from contacting with the latter surface (i.e., to prevent an incorrect key touch). Since this condition is sufficiently stable, it is not normally necessary to fix the touch panel section 40 to the base unit 20. However, in case of inputting those characters or illustrations that require delicate workings, it is possible to fix the touch panel section 40 to the base unit 20 by configuring the protrusion members 42 in the same manner as the aforesaid latch 34.

Figure 2:
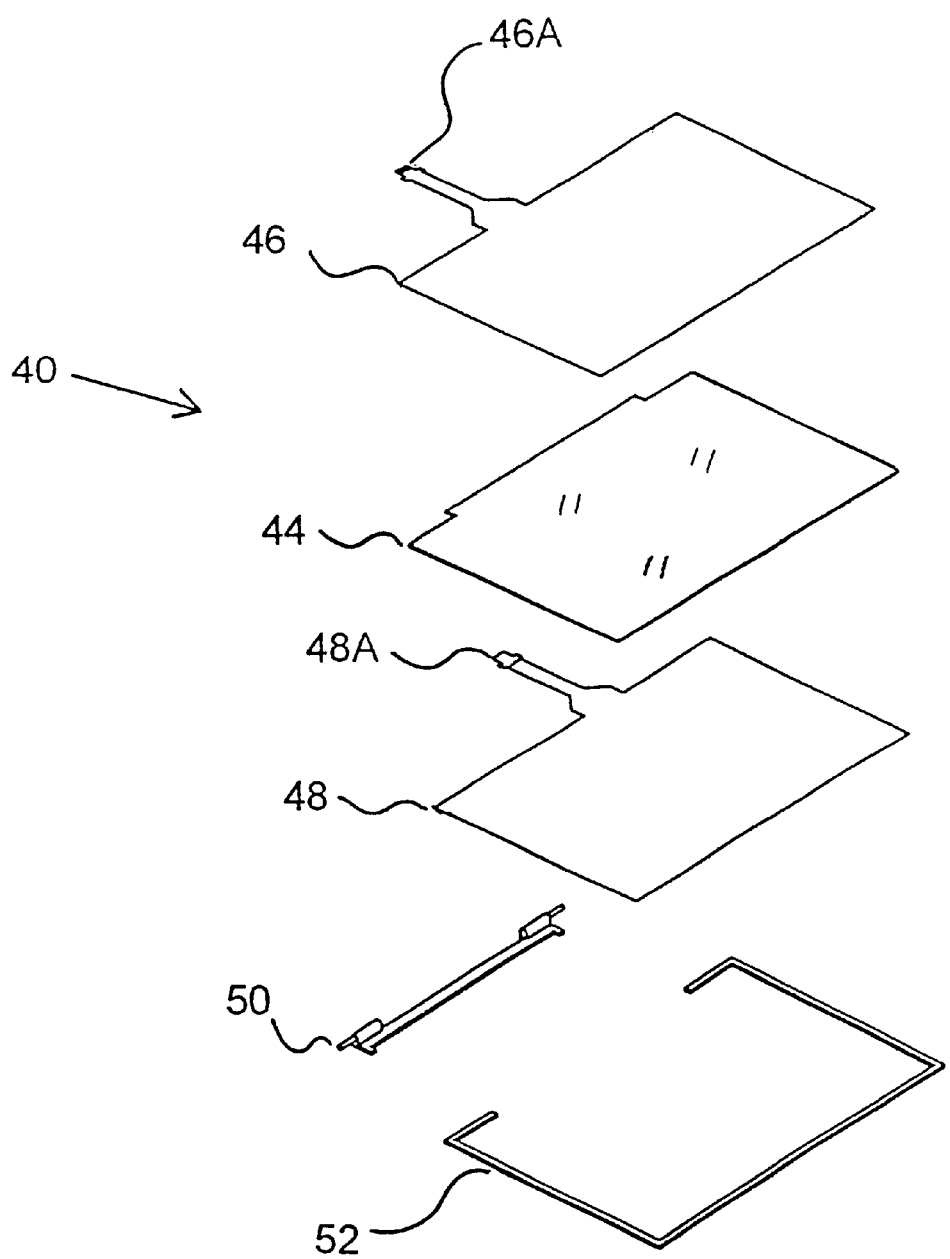
FIG. 2 is a diagram showing each component of a touch panel section in accordance with this invention.

In FIG. 2, there is shown each component of the touch panel section 40 at its corresponding assembly position respectively. To form the touch panel section 40, transparent resistive film sheets 46 and 48 each having substantially the same characteristics are affixed onto both of front and back surfaces of a transparent glass plate 44 (corresponding to a substrate) respectively and, then, a hinge mechanism 50 along with a reinforcement frame 52 are provided on its periphery as shown. On appropriate ends of the reinforcement frame 52, the aforesaid protrusion members 42 (not shown) may be provided. Next, the hinge mechanism 50 of the touch panel section 40 is mounted to a rear end of the base unit 20 in the proximity of the aforesaid hinge mechanisms 22. In this case, wiring lines 46A and 48A extending from electrodes of the transparent resistive film sheets 46 and 48 may be electrically connected to an associated component in the base unit 20 through a space within the hinge mechanism 50 or its nearby space (see FIG. 5).

Figure 3:
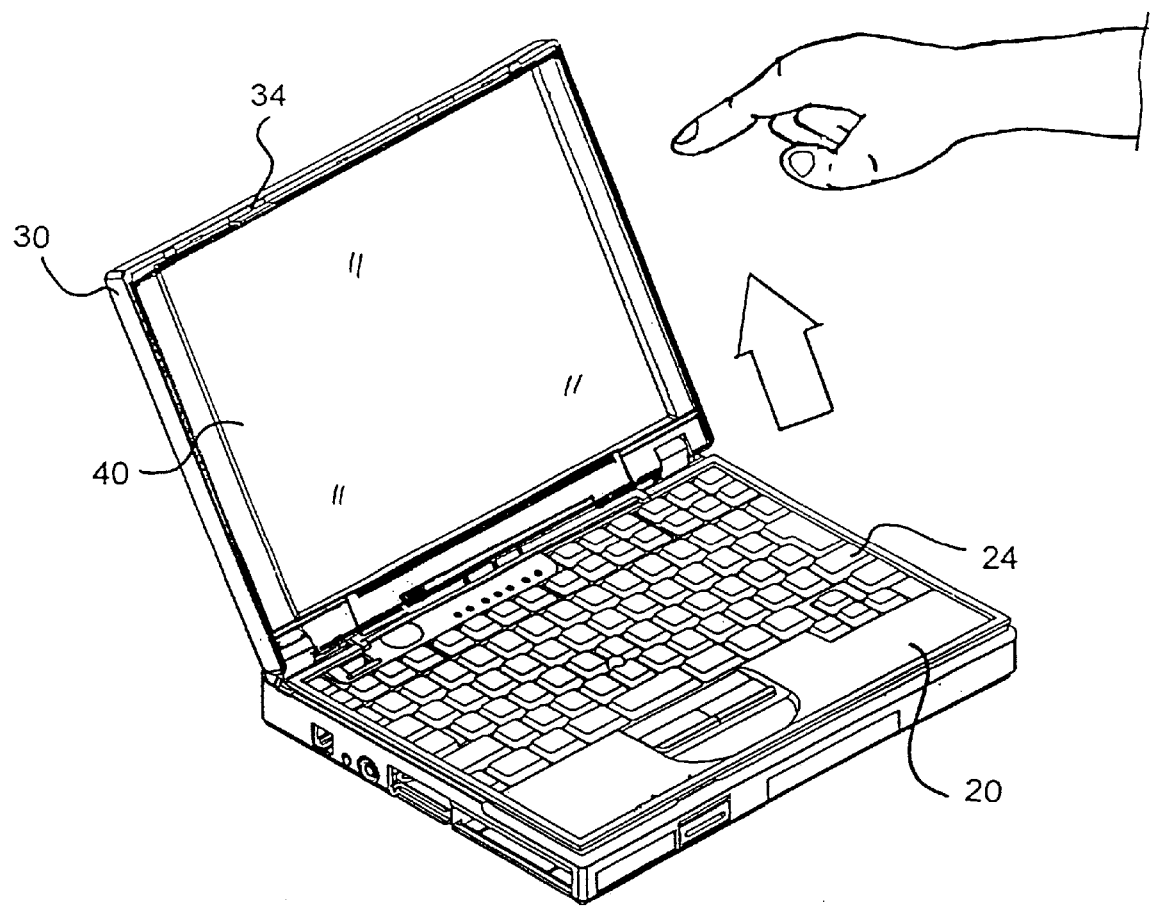
FIG. 3 is a diagram showing a normal usage condition, wherein a touch panel section in accordance with this invention is rotated toward a liquid crystal display (LCD) section 32 and fixed to a cover 30 of a notebook PC.

As shown in FIG. 3, during the normal usage, the touch panel section 40 is rotated toward the LCD 32 and fixed to the cover 30 by the latch 34. In this usage condition, it is possible to support not only a conventional input operation by the keyboard 24 but also another input operation, i.e., the tablet function, for using a fingertip to select an icon on the LCD screen, which is visibly seen through the transparent touch panel section 40. In this case, one of the surfaces of the touch panel section 40 is used.

Figure 4:
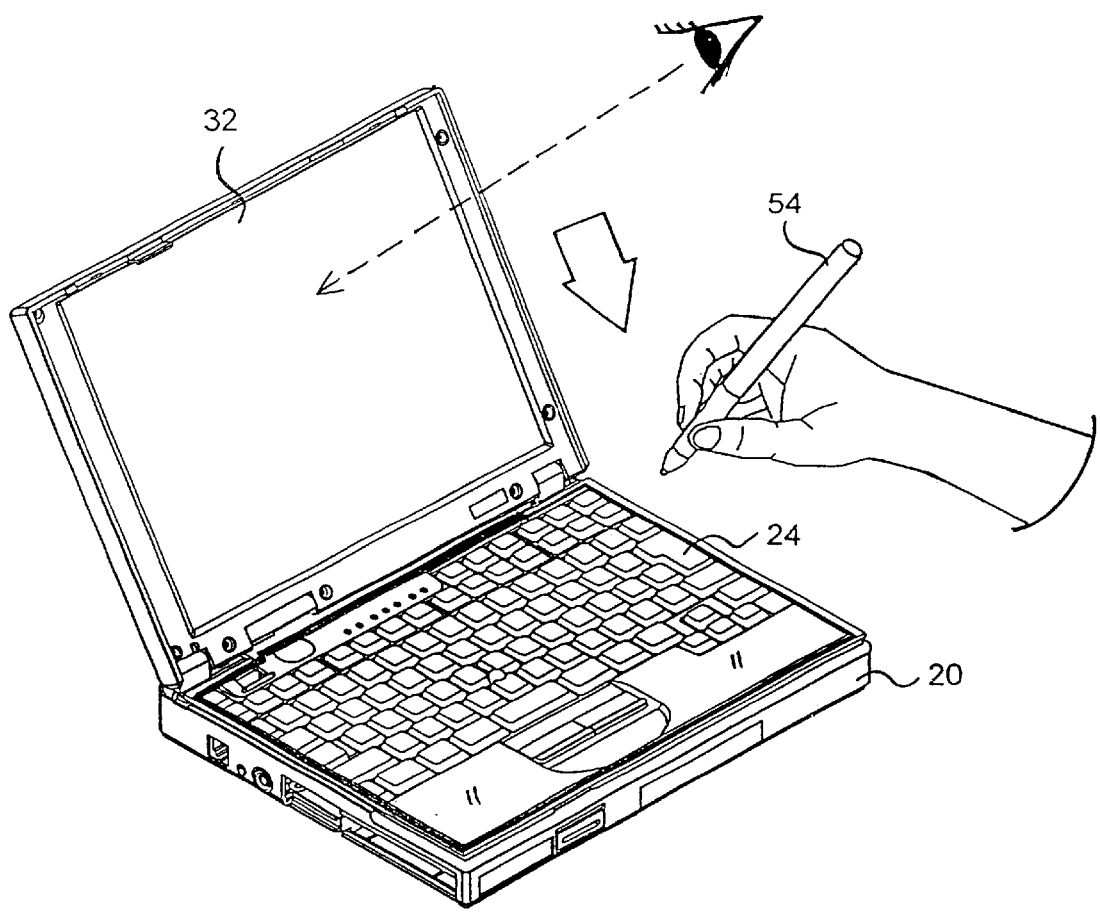
FIG. 4 is a diagram showing another usage condition, wherein a touch panel section in accordance with this invention is rotated toward a keyboard 24 and maintained substantially horizontally.

On the other hand, as shown in FIG. 4, when the touch panel section 40 is rotated toward the keyboard 24, it is maintained substantially horizontally by the aforesaid protrusion members 42 at such a position that is adequate for entirely covering the keyboard 24. This usage condition is adapted for inputting handwritten characters or illustrations that require delicate workings by using a pen 54. This is because a barycenter position of the notebook PC 10, which rests on the side of the base unit 20, causes this usage condition to be better balanced, and because it is preferable that an angle of a working surface for inputting handwritten characters or the like is flat as much as possible. Further, because it enables to observe the LCD screen concurrently with an input operation, a user is able to perform such an input operation as the user confirms correction of inputted characters, information of an error message and the like. In this case, the other surface of the touch panel section 40 is used.

In FIG. 5, there is shown a schematic hardware configuration of the notebook PC 10. However, only those components associated with an embodiment of this invention will be briefly described below, since the configuration as shown is well known in the art and does not pertain to the gist of this invention.

A main memory 60 is a writable memory used as read-in areas or working areas of programs executed on a CPU 62. In general, such executed programs include an existing OS (e.g., PEN-OS or PenDOS) that is adapted for recognizing handwritten characters and displaying the appropriately corrected characters on the LCD 32, each device driver for operating a peripheral device as hardware, and a variety of application programs. This type of OS is provided with a function for allocating attributes to a certain input area, thereby enabling one or more commands to be executed in response to a touch on the area.

A video controller 64 is a dedicated controller for processing drawing instructions from the CPU 62. In operation, it temporarily stores the processed drawing information into a screen buffer (VRAM) 66, reads the drawing information from VRAM 66 and outputs the same as video data to the LCD 32.

A keyboard/mouse/touch panel controller 68 is a dedicated controller for capturing, in addition to input scan codes from the keyboard 28 and/or coordinate values from a pointing device (e.g., mouse or TrackPoint) 70, those coordinate values from a touch panel control circuit 72.. This touch panel control circuit 72 is configured in such a way that it receives electrical signals from the touch panel section 40 via its wiring lines 46A and 48A (FIG. 2) and detects any changes of electrical resistance in accordance with a pressure by a fingertip or the pen 54 (FIG. 4), thereby to output the resultant coordinate values. Also, if it is desired to suppress a noise signal from an unused surface of the touch panel section while the other surface is being used, the touch panel control circuit 72 may be so configured as to inhibit concurrent application of electrical signals from these surfaces.

In case of capturing the aforesaid input data, the keyboard/mouse/touch panel controller 68 performs selective inhibiting and switching of this input data. For example, if an application program does not allow concurrent input operation of the mouse and the TrackPoint, under control of the keyboard/mouse/touch panel controller 68, input data of the mouse will be inhibited and input data of the TrackPoint will be preferentially accepted. Similarly, input data from the touch panel section 40 is fed to the CPU 62 as well by way of the keyboard/mouse/touch panel controller 68. It should be understood by those skilled in the art that the inhibition of concurrent application and/or setting of the switching priorities among input devices including the keyboard 24 may be determined based on usability of an individual application program to be used.

Figure 6:
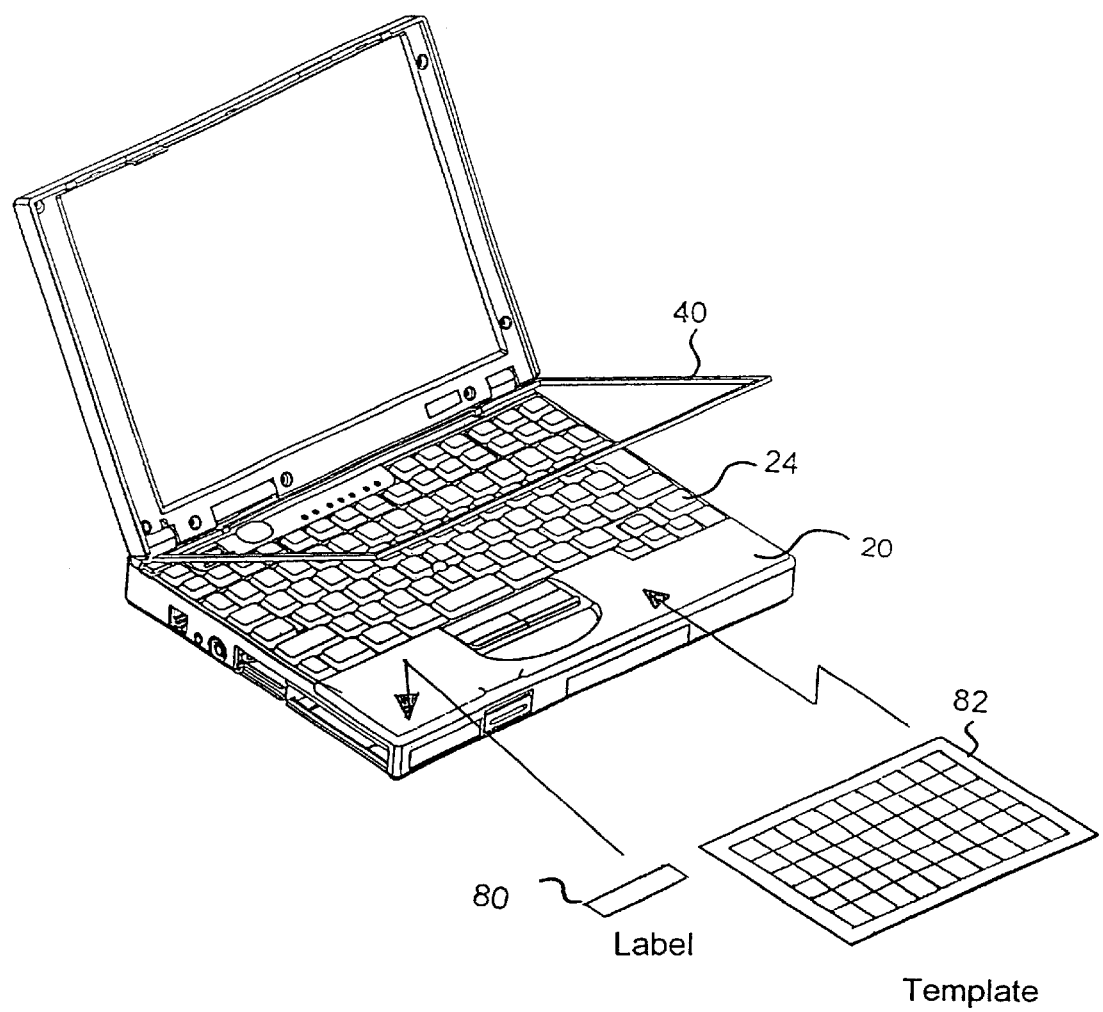
FIG. 6 is a diagram illustrating a first additional function of this invention.

Next, with reference to FIGS. 6 and 7, additional functions of this invention will be described.

As described above, the touch panel section 40 of this invention is formed by affixing the transparent resistive film sheets 46 and 48 onto both of front and back surfaces of the transparent glass plate 44 respectively, and it is rotatably mounted between the keyboard 24 and the LCD 32. Thus, in case of using the touch panel section 40 rotated toward the keyboard 24, the system may be programmed to cause characters imprinted on keytops, which are visibly seen through the touch panel section 40, to be recognized as icons or commands. Accordingly, even in an unfavorable environment other than desktop where the notebook PC 10 has to be used in an unstable situation or in a quiet environment where the keyboard 24 may not be actually used to suppress a keying sound generated therefrom, it is possible to perform an input operation by making use of a fingertip or the pen 54. Further, as shown in FIG. 6, affixing a label 80 that is created to contain icons or commands depending on a user application to a dead space such as a palm rest on the top surface of the base unit 20, it is possible to widen choices of those icons and characters available for input operation. Also, laying a keyboard template 82 that contains foreign characters under the touch panel section 40, it is possible to enter characters corresponding to a foreign application in a simpler manner.

Figure 7:
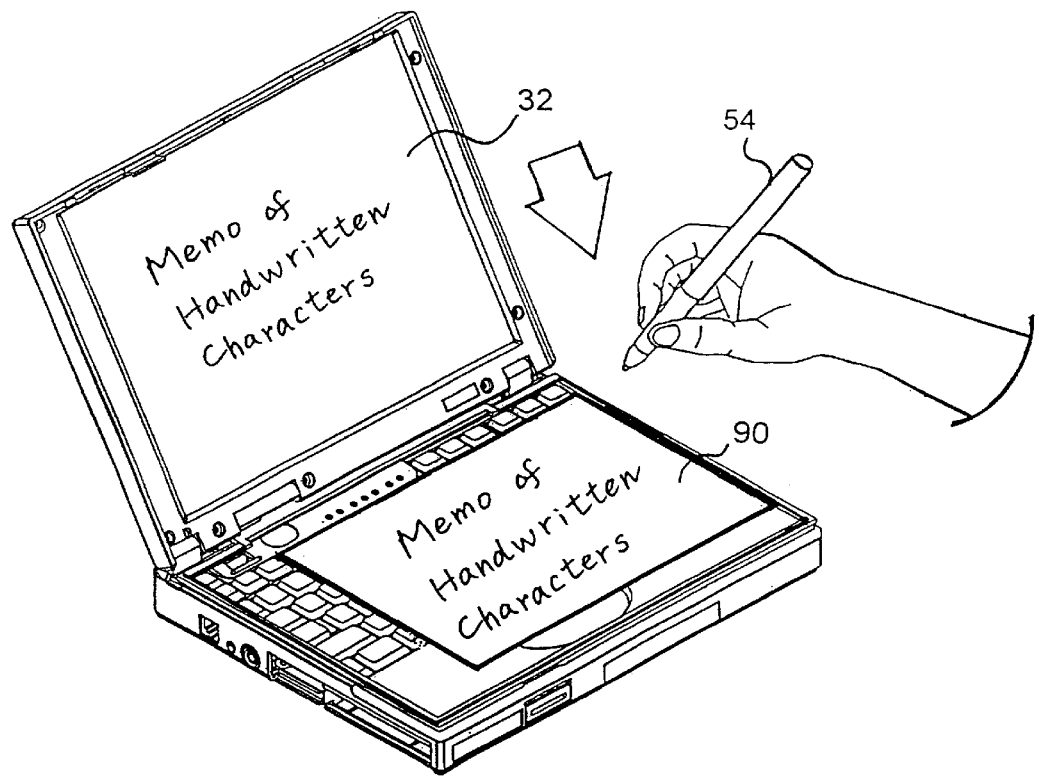
FIG. 7 is a diagram illustrating a second additional function of this invention.

Further, since the touch panel section 40 of this invention makes use of the so-called resistive film sheet scheme adapted for detecting a pressure imposed by the pen 54, when a memorandum or a signature is to be written into a paper 90 placed on a surface of the touch panel section 40, as shown in FIG. 7, it is possible to correctly capture the inputted result into the base unit 20 as a user concurrently confirms the inputted result displayed on the LCD 32. In this case, while there are limits on a thickness of the paper 90 and the number thereof, it is possible to capture the input data in the same manner as taking a carbon copy of the handwritten memorandum, and yet it is possible to record data of important information such as handwriting and/or pen pressure of a signature.

As described above, since the touch panel section 40 of this invention is rotated toward either one of the sides for supporting a current input operation when a user is to use the notebook PC, and yet it is accommodated in a space between the LCD and keyboard when a user is to carry the notebook PC, it is possible to improve productivity of such input operations without degrading the advantageous space-saving and/or portability features of the notebook PC.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed:

1. A portable electronic device including a base unit accommodating components therein and having a keyboard mounted on a top surface thereof, together with a cover being rotatably hinged at a rear end of said base unit to have an open position and a closed position relative to said base unit, said cover being provided with a flat panel display on a surface that is concealed in said closed position, comprising:

a touch panel section formed by affixing transparent resistive film sheets onto both of front and back surfaces of a transparent glass plate respectively, thereby forming a touch-sensitive area at each of opposite sides of said touch panel section;

means for rotatably hinging said touch panel section at a rear end of said base unit;

means, being operative when said touch panel section is rotated toward said flat panel display, for fixing said touch panel section to said cover so as to maintain one of said opposite sides of said touch panel section at a predetermined distance from the surface of said flat panel display;

means, being operative when said touch panel section is rotated toward said keyboard, for maintaining another of said opposite sides of said touch panel section in a substantially horizontal manner at a predetermined distance above an upper surface of said keyboard; and means for electrically connecting one or more electrode terminals of said resistive film sheets to a given component accommodated in said base unit.

2. The portable electronic device of claim 1, wherein said electronic device is a notebook personal computer.

3. The portable electronic device of claim 2, wherein said flat panel display is a liquid crystal display unit.

4. The portable electronic device of claim 3, wherein one of said touch sensitive areas is used as a tablet for capturing pointing input when said touch panel section is rotated toward said flat panel display, whereas the other of said touch sensitive areas is used as a digitizer for capturing handwritten character input when said touch panel section is rotated toward said keyboard.

5. The portable electronic device of claim 3, wherein said given component inhibits concurrent application of electrical signals conveyed from the electrode terminals of said resistive film sheets.

* * * * *